US006782765B2

(12) United States Patent
Dussault

(10) Patent No.: US 6,782,765 B2
(45) Date of Patent: Aug. 31, 2004

(54) FLUID FLOW TRANSDUCER MODULE AND ASSEMBLY

(75) Inventor: David R. Dussault, Hollis, NH (US)

(73) Assignee: Thermo Electron Corporation, Waltham, MA (US)

( * ) Notice: Subject to any disclaimer, the term of this patent is extended or adjusted under 35 U.S.C. 154(b) by 0 days.

(21) Appl. No.: 10/611,710

(22) Filed: Jul. 1, 2003

(65) Prior Publication Data

US 2004/0003667 A1 Jan. 8, 2004

Related U.S. Application Data

(60) Provisional application No. 60/393,288, filed on Jul. 2, 2002.

(51) Int. Cl.$^7$ ................................................. G01F 1/05

(52) U.S. Cl. .................................................. 73/861.79

(58) Field of Search .......................... 73/861.79, 861.75, 73/273

(56) References Cited

U.S. PATENT DOCUMENTS

| 4,140,009 A | 2/1979 | Wolf et al. |
| 4,173,144 A | 11/1979 | Pounder |
| 6,542,832 B1 | 4/2003 | LaMothe |

*Primary Examiner*—Harshad Patel
(74) *Attorney, Agent, or Firm*—Pandiscio & Pandiscio; Scott R. Foster

(57) ABSTRACT

A fluid flow transducer module includes a fluid flow conduit having an inlet for receiving fluid, a transducer for measuring rate of flow of the fluid, an interface in communication with the transducer and adapted to receive rate of flow measurements from the transducer, the conduit having an outlet for flowing the fluid from the transducer to a reservoir, the outlet extending transversely of the conduit, a housing for the conduit, conduit inlet, conduit outlet, and transducer, the housing having opposed first and second walls, each wall having an opening for the outlet therein, and at least one of the walls being adapted for stacking engagement with a second transducer module of a same structure, such that the outlets of the modules are aligned to form a common conduit, and the interconnected modules form a flow transducer assembly having a plurality of fluid flow conduits and transducers.

18 Claims, 6 Drawing Sheets

FLUID FLOW TRANSDUCER MODULE AND ASSEMBLY

CROSS-REFERENCE TO RELATED APPLICATION

This application claims the benefit of U.S. Provisional Patent Application Serial No. 60/393,288, filed Jul. 2, 2002 in the name of David R. Dussault.

BACKGROUND OF THE INVENTION

1. Field of the Invention

The invention relates to fluid flow transducers and is directed more particularly to a fluid flow transducer module which is adapted for combining with other such modules of similar structure to provide a fluid flow transducer module including a stack of modular modules including a selected number of flow transducers.

2. Description of the Prior Art

In the fluid chiller and fluid conditioning systems arts, a common requirement is to measure the fluid flow rate in various parts of recirculating loops, which may be many in number. The flow measurement often is done electronically by means of off-the-shelf flow transducer technologies. The devices produce an electronic signal, of a type selected from known various types, which is interpreted by a control system and the fluid flow value is displayed or retransmitted for monitoring purposes. In some cases, this signal is used internally as feedback in a control loop for controlling flow in the process channel or device.

The aforementioned single-channel flow transducer devices are available in a wide range of flow ratings, employing several sensor technologies, and are available from many manufacturers. Often fluid chillers and/or conditioning systems require monitoring of multiple flow channels. This has typically been accomplished by off-the-shelf single-channel flow transducers assembled, usually in a parallel flow pattern, with a variety of plumbing fittings, tubes and hoses in some sort of manifold arrangement.

Although the arrangement of such standard devices has been functionally correct, building the manifolds has been very labor-intensive, particularly as the number of flow channels increases. In some cases, custom-machined parts and fittings are required to achieve the desired connection type and size the conditioning system requires, which, in itself, is usually expensive. The large number of parts and fittings, and associated manufacturing and installation labor, may be reduced by consolidating such parts and fittings and by integrating their functionality into a multi-channel flow transducer unit. However, the fully integrated unit itself tends to be expensive and, once developed, is difficult to adapt to other applications.

Each multi-channel configuration typically requires a custom design and custom tooling, including special molds, for each unique application. If a 4-channel "modules" is required for one particular project, a custom 4-channel mold must be utilized. If there is a future requirement for a 6, 8 or 10 channel flow transducer, each subsequent variation requires further development and custom tooling costs, which for relatively low-volume applications can be cost prohibitive.

There is an increasing demand in the market for fluid chillers and/or conditioning systems, for overall cost reduction and, concurrently, for varied and numerous combinations of needs for fluid flow measurement.

SUMMARY OF THE INVENTION

An object of the invention is, therefore, to provide a low-cost flow transducer module which can be combined with other similar modules to provide custom flow transducer assemblies which reduce the physical space required for the transducers and associated piping, improve manufacturability, reduce assembly is labor, and improve overall reliability, functionality and serviceability of the system.

With the above and other objects in view, a feature of the present invention is the provision of a fluid flow transducer module comprising a fluid flow conduit having an inlet for receiving fluid from a fluid discharging apparatus, a transducer associated with the conduit for measuring rate of flow of the fluid through the conduit, and an interface in communication with the transducer and adapted to receive rate of flow measurements from the transducer and to effect at least one of (i) a display of measurements to an operator, (ii) a remote monitoring of measurements, and (iii) a corrective signal for modifying the rate of flow. The fluid flow conduit is provided with an outlet for flowing the fluid from downstream of the transducer to a reservoir for the fluid, the outlet extending transversely of the conduit. The invention further comprises a housing for the conduit, conduit inlet, conduit outlet, and transducer, the housing having opposed first and second walls, each of the walls having an opening for the outlet therein. At least one of the walls is adapted for stacking engagement with a second fluid flow transducer module of a substantially same structure, such that the outlets of the module are aligned to form portions of a common conduit.

In accordance with a further feature of the invention, there is provided a fluid flow transducer module comprising first and second fluid flow transducer modules. Each of the modules comprises a fluid flow conduit having an inlet for receiving fluid from a fluid discharging apparatus, a transducer associated with the conduit for measuring rate of flow of the fluid through the conduit, and an interface in communication with the transducer and adapted to receive and act on rate of flow measurements from the transducer. The fluid flow conduit is provided with an outlet for flowing the fluid from the transducer to a reservoir, the outlet extending transversely of the fluid flow conduit. A housing is provided having opposed first and second walls, each of the walls having an opening for the outlet therein, at least one of the walls of the first module being adapted for stacking engagement with at least one of the walls of the second module. The first and second modules are joined together at the one walls to form the fluid flow transducer assembly, and the fluid flow conduit outlets are thereby aligned to form a common conduit in communication with a reservoir for the fluid.

In accordance with a still further feature of the invention, there is provided a fluid flow transducer assembly comprising a plurality of transducer modules fastened together in stacked fashion, each of the modules having a fluid flow conduit in communication with a fluid source, a flow rate measuring transducer for measuring flow rate through the flow conduit, and an outlet for flowing fluid from the flow conduit out of the module. The outlet of each of the modules extends through the module from one side to another, and a collar member is disposed at one end in the outlet of a first of the modules and at a second end in the outlet of a second of the modules to align the first and second modules. The outlets and the collar members form a common outlet conduit for the modules.

The above and other features of the invention, including various novel details of construction and combinations of parts, will now be more particularly described with reference to the accompanying drawings. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
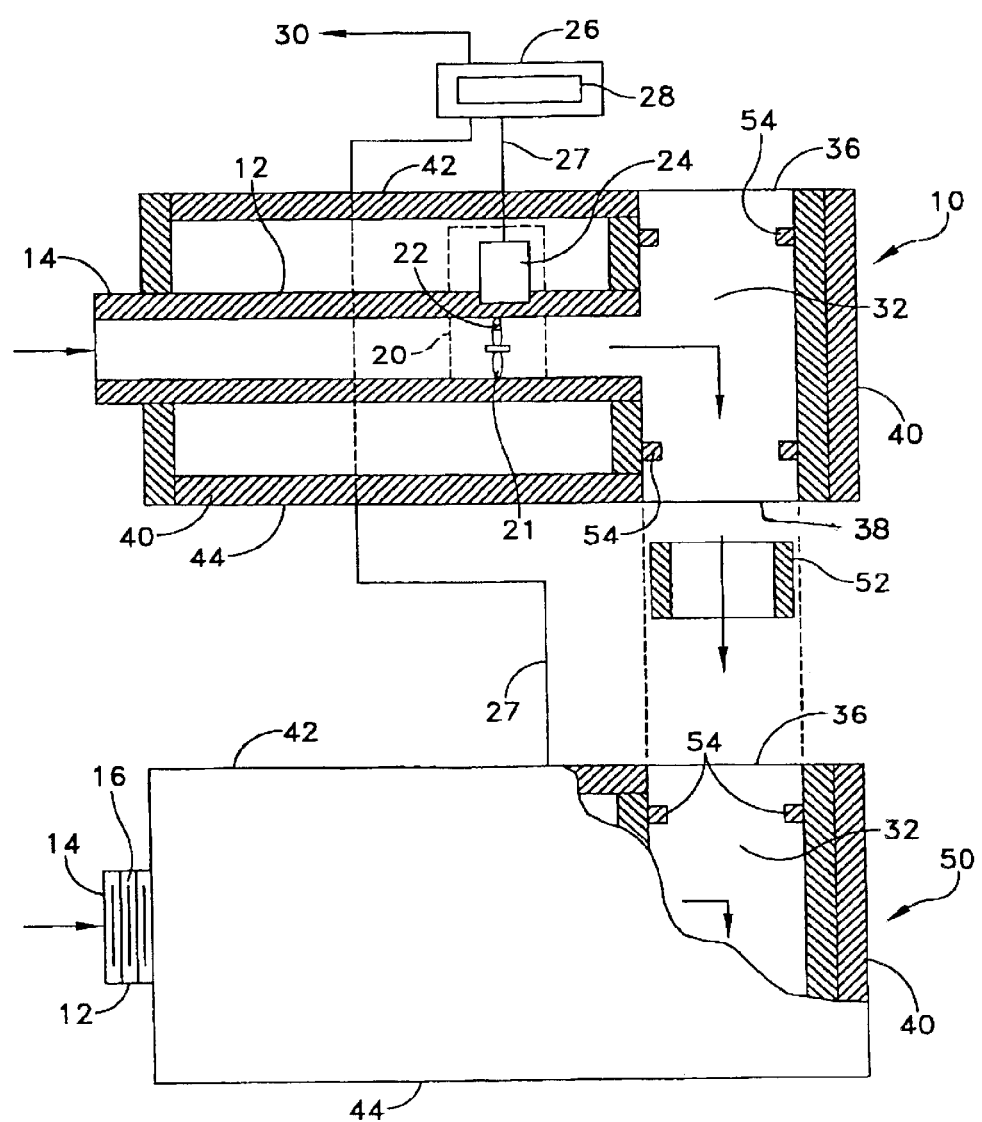
FIG. 1 is a diagrammatic, generally sectional, partly broken-away view of one form of fluid flow transducer module illustrative of an embodiment of the invention.
Figure 2:
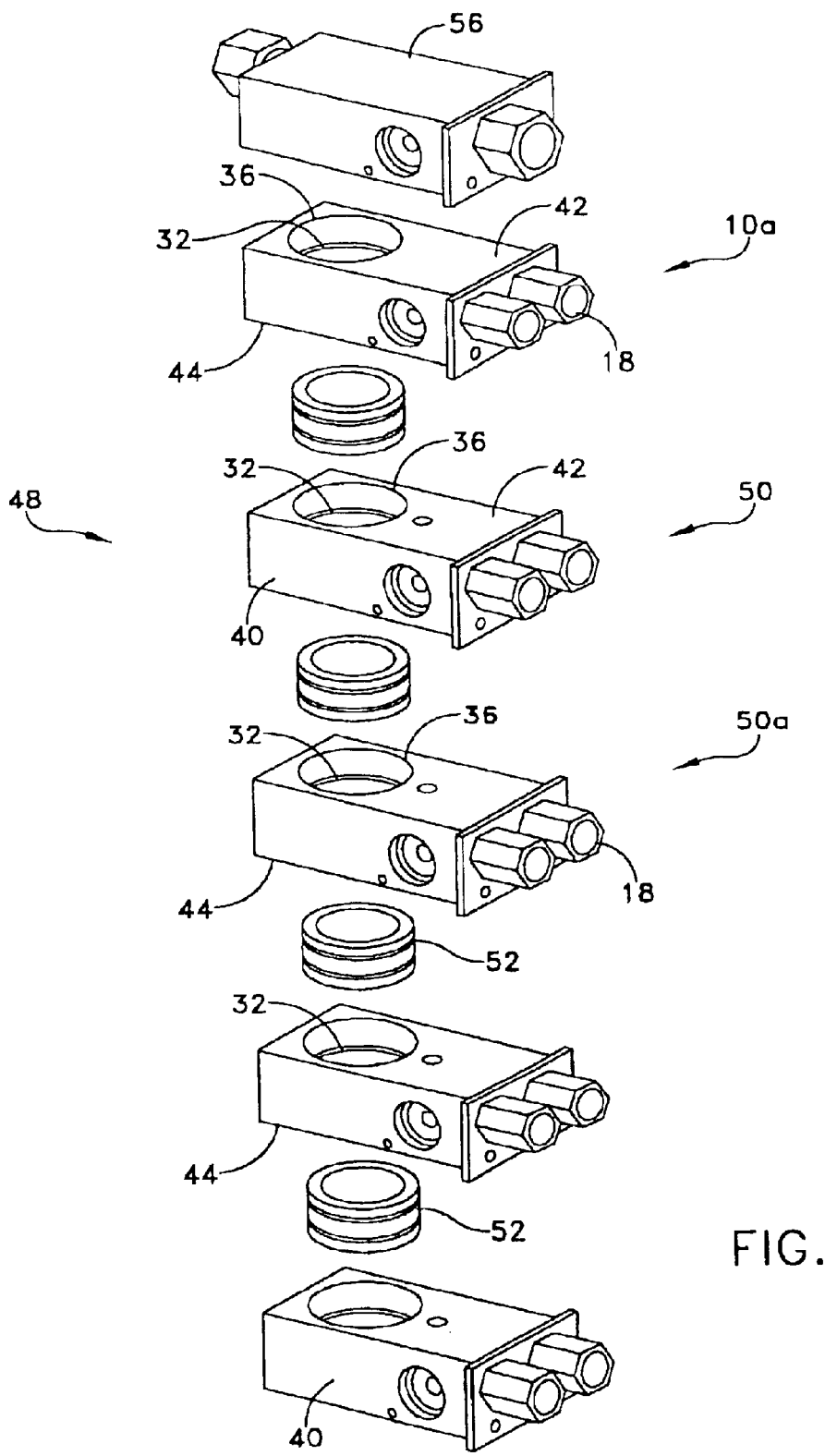
FIG. 2 is an exploded view of five modules of the type shown in FIG. 1.
Figure 3:
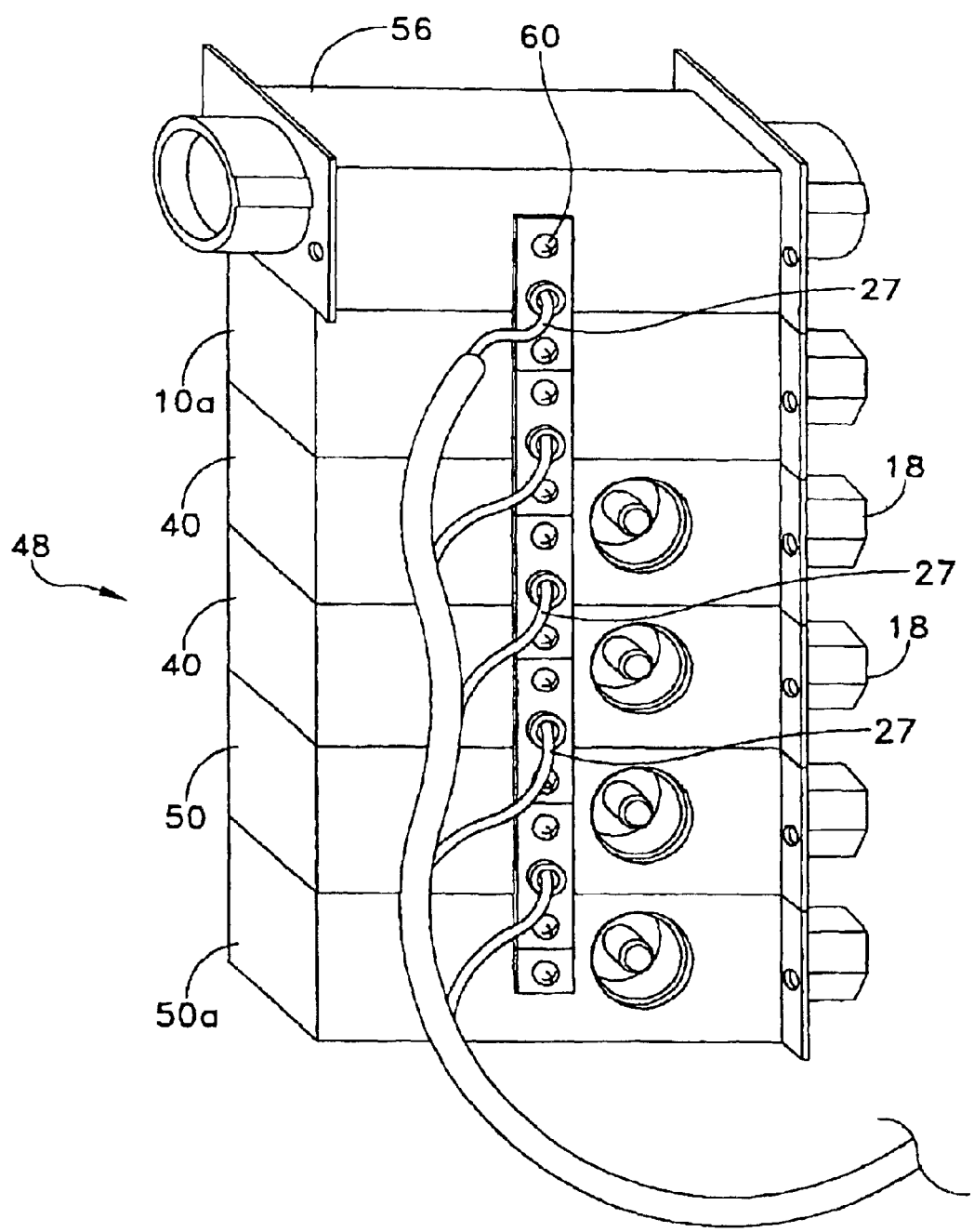
FIG. 3 is a perspective view of the modules of FIG. 2 fastened together in stacked relationship to form a fluid flow transducer assembly illustrative of a further embodiment of the invention.
Figure 4:
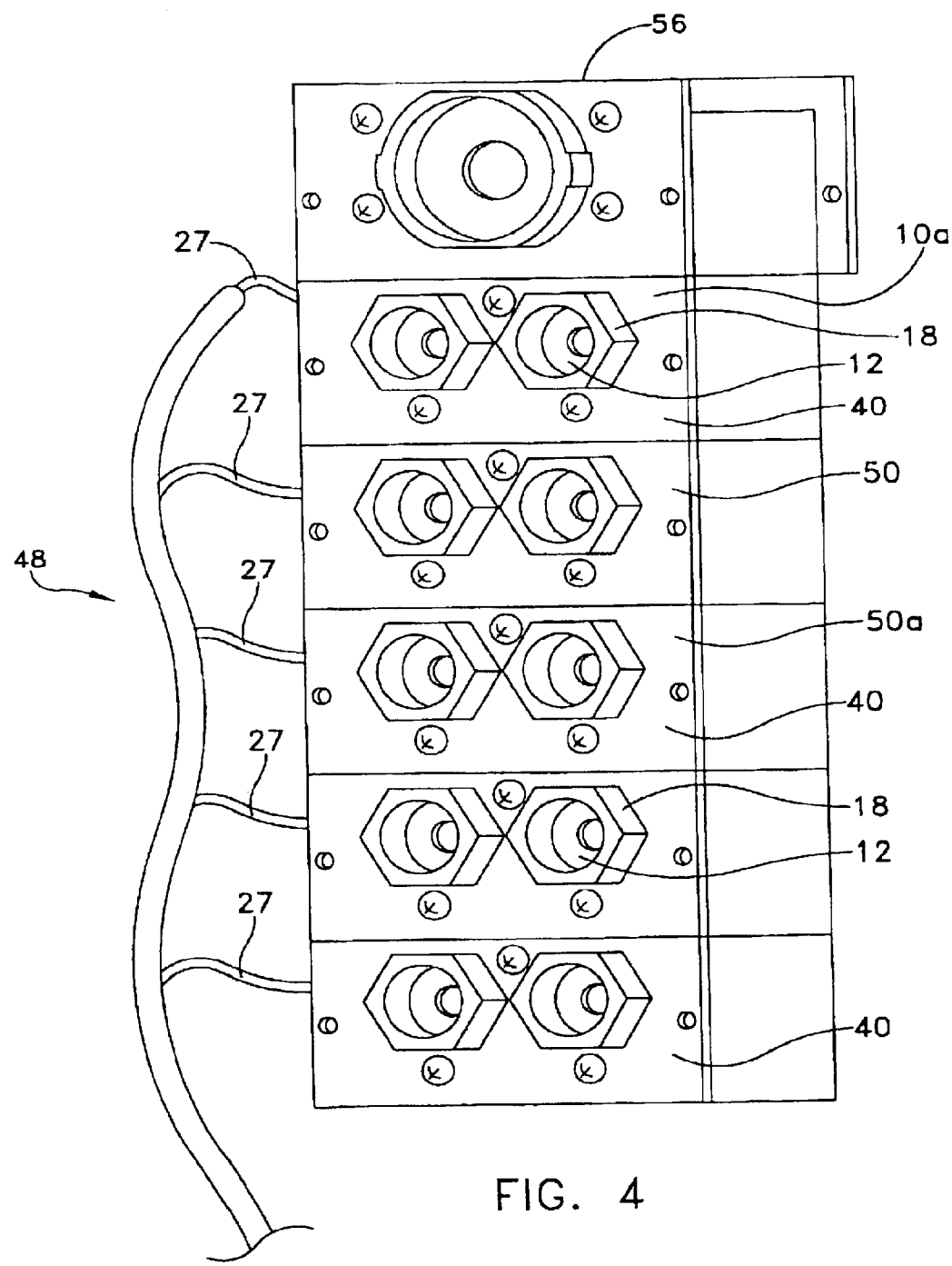
FIG. 4 is a perspective view of the assembly of FIG. 3, and illustrating an alternative embodiment in which each module is provided with two side-by-side fluid flow conduits.

Referring to FIG. 1, it will be seen that an illustrative fluid flow transducer module 10 includes a fluid flow conduit 12 a having an inlet 14 for receiving fluid from a fluid discharging apparatus, such as a chiller or other fluid conditioner (not shown). The conduit inlet 14 is adapted, as by threads 16, or other connecting means, to receive an external pipe or hose adapter fitting connection 18 (FIG. 2), to effect delivery of the fluid flow to the conduit inlet 14 of the flow transducer module 10.

The module 10 further includes a transducer 20 (FIG. 1) associated with the conduit 12 in known fashion to effect measurement of the rate of flow of the fluid therethrough. In an illustrative transducer, a wheel, or propeller blade 21, is turned by the moving fluid and has fixed thereto a magnet 22 which passes by a detector 24 which communicates with an interface, which may be a computer, or other monitoring or control device 26, as by a cable 27, and which may include a display screen 28, or other user interface. Alternatively, the computer 26 can be configured to send corrective signals 30 to pumps or valves, or the like (not shown), to modify the flow rate.

The fluid flow conduit 12 is provided with an outlet 32 for flowing the fluid downstream of the transducer 20 to a reservoir, such as a tank 34 (FIG. 5) located beneath the module. The outlet 32 extends transversely of the conduit 12 and is provided with openings 36, 38 (FIG. 1).

The module 10 further includes a housing 40 in which is disposed the conduit 12, a portion of the conduit inlet 14, the conduit outlet 32, and the transducer 20. The housing 40 may be of metal or a rigid plastics material and is provided with opposed first and second walls 42, 44, each having therein one of the openings 36, 38, respectively, for the conduit outlet 32. At least one of the walls 42, 44, and usually both of the walls 42, 44, is adapted for stacking engagement with a second fluid flow transducer module 50 which, in turn, is adapted for stacking engagement with a further transducer module 50a (FIGS. 2–5), and so on, with a sufficient number of transducers for a particular application.

Figure 1A:
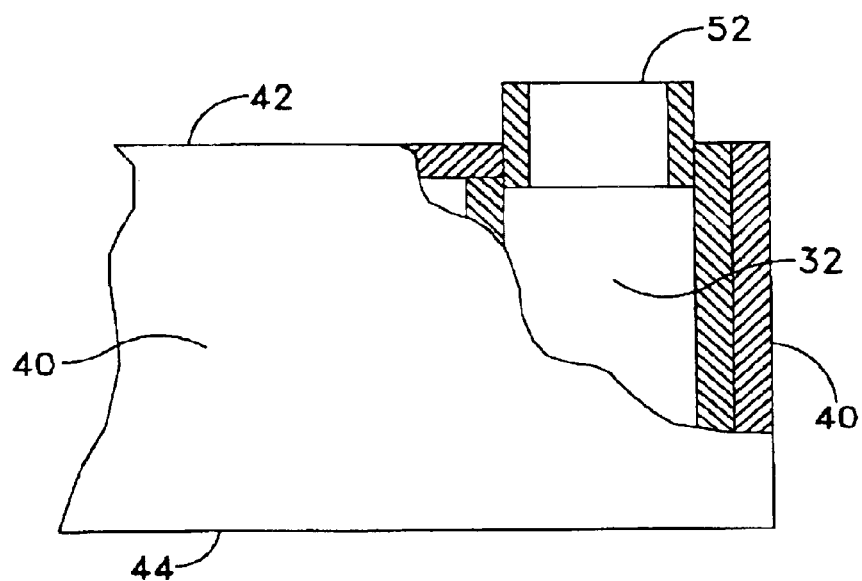
FIG. 1A is similar to a portion of FIG. 1, but illustrative of an alternative embodiment of fluid flow transducer module.

To aid in quickly assembling the modules 10, 50, 50a, etc., together, collars 52 are provided for slipping into opposed openings 36, 38. The conduit outlets 32 may be provided with internal projections, such as detents 54 (FIG. 1), for positioning and holding of the collars 52. Alternatively, each of the collars 52 may be fixed in, or provided as an integral part of, one of the openings 36, 38, and adapted to enter an opposed one of the openings 36, 38 (FIG. 1A).

The uppermost transducer module 10a of an assembly 48 (FIGS. 2–5) may be capped so as to close the upper opening 36. Alternatively, if one or more flow transducer modules with inlet and/or outlet connections independent of the common conduit is required, an independent flow transducer module 56 may be assembled in conjunction with other modules to act as an end cap for the adjacent common conduit at the interface with the uppermost fluid flow transducer module 10a. Alternatively, the module 56 may be a "dummy" block having one or more unmonitored channels therein, or may be simply a cap with no channels therein. In like manner, depending upon the function of the assembly 4B, there may be an unmonitored module disposed in place of one or more of the modules 10, 10a, 50, 50a. The assembly lower opening 38 may be fitted onto a return pipe 58 (FIG. 5) which extends to the reservoir 34.

Figure 5:
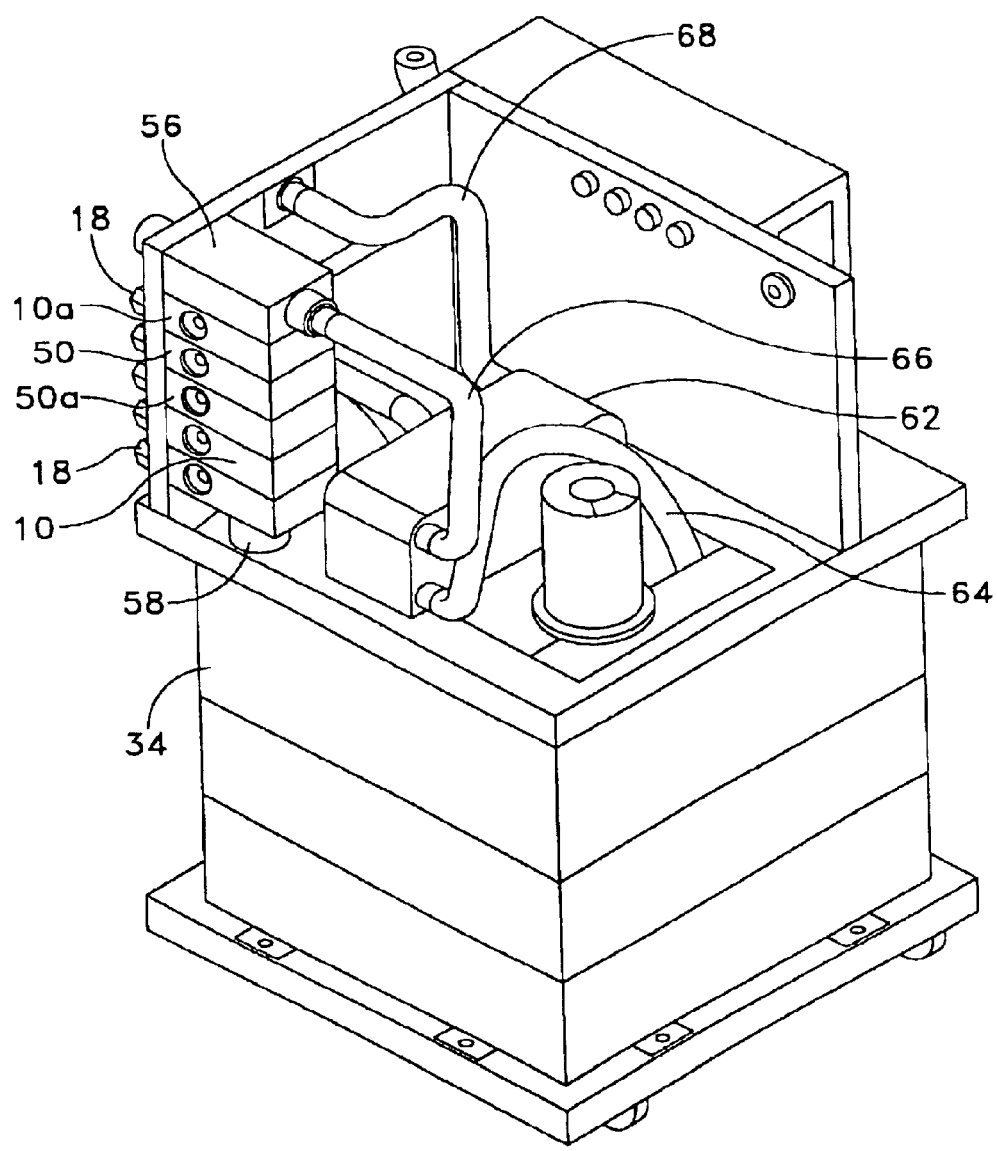
FIG. 5 is a perspective view of the assembly of FIG. 4 shown mounted on a fluid receiving, monitoring, treating and recycling apparatus illustrative of an exemplary use of the invention.

The complete assembly 48 of fluid flow transducer modules and any independent modules may be stacked and locked together by a bar 60 (FIG. 3) which may be provided with appropriate holes therein to permit passage of the transducer cables 27 therethrough. The entire assembly 48 may then be placed on the reservoir, as shown by way of example, in FIG. 5. There may be mounted on the reservoir a heat exchanger 62 with appropriate inlet and outlet pipes 64, 66, 68. In FIG. 5, one of the heat exchanger outlet pipes 66 is shown connected to the aforementioned independent fluid flow transducer module 56.

It will be apparent that the module shown and described herein may be used in a manner reversed to that set forth above. That is, the module may be used in a manner wherein fluid is ingested by way of pipe 58, which becomes a feed pipe, and flowed through the "outlet" 14, which in this alternative embodiment actually serves as an inlet which distributes the incoming fluid to the various fluid flow conduits 12.

The individual fluid flow transducer modules 10, 50 may each be provided with a selected number of fluid flow conduits 12 and associated components of the transducers 20. While each transducer module may be provided with as little as one conduit, it has been found more economical and physically compact to provide two fluid flow conduits 12 per housing 40. Higher numbers of conduits may be used, but may be unduly wasteful if only one or two conduits are needed to complete a manifold.

It has been found that modular fluid flow transducer modules as described above can be made quickly and inexpensively and easily stored for future use. When an order is received for a manifold having a specified number of conduits, the required number of transducer modules is fitted and fixed together to form an appropriate fluid flow transducer assembly 48 in short order. In addition to being inexpensively made and time-saving in arranging with other modules, it has been found that servicing is also quick and inexpensive. By removing the bar 60, a faulty module can be removed and replaced without further ado.

It will be understood that the present invention is by no means limited to the particular construction herein disclosed and/or shown in the drawings, but also comprises any modifications or equivalents within the scope of the claims. For example, the term "wall" is used in its broadest sense, meaning any boundary layer enclosing a space.

What is claimed is:

1. A fluid flow transducer module comprising:
   a first fluid flow conduit having an inlet for receiving fluid from a fluid discharging apparatus;
   a transducer associated with said conduit for measuring rate of flow of the fluid through said conduit;
   an interface in communication with said transducer and adapted to receive rate of flow measurements from said transducer and to effect at least one-of (i) a display of measurements to an operator, (ii) a remote monitoring of measurements, and (iii) a corrective signal for modifying the rate of flow;
   said fluid flow conduit having an outlet for flowing the fluid from downstream of said transducer to a reservoir for the fluid, the outlet extending transversely of said conduit;
   a housing for said conduit, the conduit inlet, the conduit outlet, and said transducer, said housing having opposed first and second walls, each of the walls having an opening for the outlet therein; and
   at least one of the walls being adapted for stacking engagement with a second transducer module of a substantially same structure, such that the outlets of the modules are aligned to form portions of a common outlet conduit.

2. The fluid flow transducer module in accordance with claim 1 and further comprising:
   a second fluid flow conduit extending alongside said first fluid flow conduit in said housing, said second fluid flow conduit having a second inlet for receiving fluid from a selected one of (i) the fluid discharging apparatus, and (ii) another fluid discharging apparatus;
   a second transducer associated with said second fluid flow conduit for measuring rate of flow of fluid from the selected fluid discharging apparatus;
   the interface in communication with said second transducer and adapted to receive rate of flow measurements from said second transducer and to effect a selected one of (i) a display of measurements to an operator, (ii) a remote monitoring of measurements, and (iii) a corrective signal for modifying the rate of flow;
   said second fluid flow conduit having a second outlet in fluid flow communication with the common outlet conduit for flowing the fluid from downstream of said second transducer to the reservoir for the fluid; and
   said housing having therein said second fluid flow conduit, the second conduit inlet, said second transducer, and the second outlet.

3. The fluid flow transducer module in accordance with claim 1 wherein the fluid flow conduit inlet is adapted to receive and retain a fitting connection for a hose.

4. The fluid flow transducer module in accordance with claim 1 wherein the fluid flow conduit outlet is provided with internal projections, and the module further comprises a collar adapted to be disposed in the outlet and retained by the projections so as to extend outwardly from the outlet.

5. The fluid flow transducer module in accordance with claim 1 and further comprising a collar fixed in the conduit outlet and extending therefrom.

6. The fluid flow transducer module in accordance with claim 1 wherein said outlet conduit extends substantially normal to said fluid flow conduit.

7. The fluid flow transducer module in accordance with claim 1 wherein said housing is of a material selected from metal and rigid plastics.

8. The fluid flow transducer module in accordance with claim 1 and further comprising a cap over one of the openings in one of the walls, such that one end of said outlet conduit is closed.

9. A fluid flow transducer assembly comprising:
   first and second fluid flow transducer modules;
   each of said modules comprising:
      a fluid flow conduit having an inlet for receiving fluid from a fluid discharging apparatus;
      a transducer associated with said conduit for measuring rate of flow of the fluid through said conduit;
      an interface in communication with said transducer and adapted to receive and act on rate of flow measurements from said transducer;
      said fluid flow conduit having an outlet for flowing the fluid from said transducer to a reservoir, the outlet extending transversely of said fluid flow conduit;
      a housing having opposed first and second walls, each of the walls having an opening for the outlet therein;
      at least one of the walls of the first module being adapted for stacking engagement with at least one of the walls of the second module;
   said first and second modules being joined together at the respective one walls to form the fluid flow transducer assembly; and
   the fluid flow conduit outlets being thereby aligned to form a common conduit in communication with a reservoir for the fluid.

10. The fluid flow transducer assembly in accordance with claim 9 wherein the fluid flow outlets of the first and second modules are each provided with internal projections, and the assembly further comprises a collar disposed in the outlets of the modules and retained therein by the internal projections, the collar thereby aligning the outlets of the first and second modules.

11. The fluid flow transducer assembly in accordance with claim 9 and further comprising a collar fixed in the outlet of one of said modules and extending into the outlet of the other of said modules, the collar thereby aligning the outlets of the first and second modules.

12. The fluid flow transducer assembly in accordance with claim 9 wherein said common conduit extends substantially normal to said fluid flow conduits.

13. The fluid flow transducer assembly in accordance with claim 9 wherein said housing is of a material selected from metal and rigid plastics.

14. The fluid flow transducer assembly in accordance with claim 9 and further comprising a cap over an upper end of the outlet conduit of an uppermost of the modules.

15. A fluid flow transducer assembly comprising:
   a plurality of transducer modules fastened together in stacked fashion;
   each of said modules having a fluid flow conduit in communication with a fluid source, a flow rate measuring transducer for measuring flow rate through the flow conduit, and an outlet for flowing fluid from the flow conduit out of the module;

the outlet of each of said modules extending through the module from one side to another; and a collar member disposed at one end in the outlet of a first of the modules and at a second end in the outlet of a second of the modules to align the first and second modules;

wherein the outlets and the collar members form a common outlet conduit for the modules.

16. The fluid flow transducer assembly in accordance with claim 15 wherein the common outlet conduit extends generally normal to the fluid flow conduits.

17. The fluid flow transducer assembly in accordance with claim 16 wherein the outlet at a discharge end of the common outlet conduit is in communication with a fluid receiving reservoir.

18. The fluid flow transducer assembly in accordance with claim 17 wherein the outlet most remote from the discharge end of the common outlet conduit is capped.

* * * * *